United States Patent [19]
Wang

[11] Patent Number: 6,013,180
[45] Date of Patent: Jan. 11, 2000

[54] MINERAL FILTERING APPARATUS

[76] Inventor: Wei-Renn Wang, No. 71, Chung Hsin Street, Hsin Juang City, Taipei Hsien, Taiwan

[21] Appl. No.: 09/002,171

[22] Filed: Dec. 31, 1997

[51] Int. Cl.[7] .............................. B01D 27/02; B01D 27/08
[52] U.S. Cl. .......................... 210/232; 210/255; 210/262; 210/264; 210/265; 210/266; 210/282; 210/284; 210/314; 210/323.1; 210/475; 210/484; 210/510.1
[58] Field of Search ..................................... 210/222, 233, 210/232, 255, 256, 262, 237.1, 263, 264, 265, 282, 284, 314, 323.1, 475, 484, 502.1, 510.1

[56] References Cited

U.S. PATENT DOCUMENTS

| | | | |
|---|---|---|---|
| 4,969,996 | 11/1990 | Hanakammer | 210/282 |
| 5,076,922 | 12/1991 | DeAre | 210/282 |
| 5,223,132 | 6/1993 | Yoon | 210/264 |
| 5,225,078 | 7/1993 | Polasky et al. | 210/264 |
| 5,468,373 | 11/1995 | Chou | 210/223 |

*Primary Examiner*—David A. Reifsnyder
*Attorney, Agent, or Firm*—Pro-Techtor International Services

[57] ABSTRACT

The present invention relates to a mineral filtering apparatus in which the raw water is passed through a plurality of filtering processes, such as automatically filtrating without pressure, multiply filtering, ions exchange, sterilization, deodorizing, and releasing mineral substance. The filtering apparatus generally comprises a cover, an inlet water box, a first filtering unit, a filtering box, a second filtering unit, a storing reservoir, a mineral substance barrel that is disposed within the reservoir, an outlet filtering core that is disposed within the reservoir, a spout, a bottom bracket, and a water pan. The storing reservoir is provided with a mineral stone barrel with which the water soluble mineral substance is released. When the raw water flows from top to bottom, it can be treated with filtrating, deodorizing, ions exchange, sterilizing, magnetizing processes such that the treated water is clean and suitable for direct drinking. The treated water contains plentiful mineral substances that are nutritious to human beings.

5 Claims, 5 Drawing Sheets

MINERAL FILTERING APPARATUS

FIELD OF THE INVENTION

The present invention relates to a mineral filtering apparatus in which the raw water is passed through a plurality of filtering processes, such as automatically filtrating without pressure, multiply filtering, ions exchange, sterilization, deodorizing, and releasing mineral substance. The filtering apparatus generally comprises a cover, an inlet water box, a first filtering unit, a filtering box, a second filtering unit, a storing reservoir, a mineral substance barrel that is disposed within the reservoir, an outlet filtering core that is disposed within the reservoir, a spout, a bottom bracket, and a water pan. The storing reservoir is provided with a mineral stone barrel with which the water soluble mineral substance is released. When the raw water flows from top to bottom, it can be treated with filtrating, deodorizing, ions exchange, sterilizing, magnetizing processes such that the treated water is clean and suitable for direct drinking. The treated water contains plentiful mineral substances that are nutritious to human beings.

DESCRIPTION OF PRIOR ART

Water is an indispensable element of our life and we need it almost every minute. However, as the pollution become more and more serious in our modern society, having a pure and clean water resource is almost impossible, especially in highly populated area. Besides, as the excess use of the pesticide in the farm, the residues of chemical will finally flow into the water dam that is our main water supply.

Even our natural water resources includes underground water, lakes or water dam, and fountain, those water resources are easily polluted by different contaminated elements. For example, both the underground water and the lake can be polluted by heavy metals or chemicals or pesticide residue. Besides the water from water dam and lake can be also polluted by acid rain. As a result, when this raw water is used as our water supply, it shall be undergone sterilizing, blenching, and adding fluoride. Even the treated water is drinkable, the chemical residues from the blenching and fluoride will bring a negative influence to our health. Among those water resources, the fountain is most acceptable as it has been filtered through a plurality of sands and rocks layer. Besides, the fountain contains also plentiful mineral substance and it tastes a little bit sweet However, the fountain is not prevailed everywhere and only the mountain people can taste it.

When the water from pipeline has become our main water supply, in order to improve the water quality, a plurality of drinking facilities has been provided, for example, diluting machine for providing diluted water, filtering with resins to get clean water, filtering with retro osmosis process to get pure water, filtering with calcite stone core to get cleaning water with mineral substance. Even the raw water can be treated to attain a certain acceptable level, as the raw water contains a plurality of debris, chemicals and pesticide residues, and heavy metals, it can not be completed removed or screened out by a simple diluting or filtering process. Sterilizing or adding mineral substances may not effectively improve the water quality. Except the pollutants, the drinking water is also short with solved oxygen and mineral substance and these solved oxygen and mineral substance can not be effectively solved by the conventional water processing facilities. As a matter of fact, the conventional water processing facilities is mainly designed to improve the water quality and the nourishing elements contained within the water have been ignored for a long time. According to the study, the magnetic field and configuration of the water molecular play a vital influence to the absorbing of our human tissues as the water is drunk.

SUMMARY OF THE INVENTION

It is the objective of this invention to provide a mineral filtering apparatus in which not only the debris, chemicals and pesticide residues can be effectively removed, the water can be also provided with a plurality of nourishing elements.

It is the objective of this invention to provide a mineral filtering apparatus in which the raw water is passed through a plurality of filtering processes, such as automatically filtrating without pressure, deodorizing, and releasing mineral substance. As a result, no only will the water quality be improved and upgraded, but also will provide a sweet and nourishing drinking water. The resulted water is quite tasteful as fountain water.

According to one aspect of the present invention, a mineral filtering barrel is provided within the apparatus and the debris can be effectively stained out, the water can be further softened and purified, the bacteria can be removed, the heavy metals and the chemical pesticide can be effectively removed, the pH value can be modified, the nourishing mineral elements can be added and the magnetic field of water molecular can be rearranged. The resulted water can be easily absorbed by human tissue.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

The present invention relates to a mineral filtering apparatus in which the raw water is passed through a plurality of filtering processes, such as automatically filtrating without pressure, multiply filtering, ions exchange, sterilization, deodorizing, and releasing mineral substance.

Figure 1:
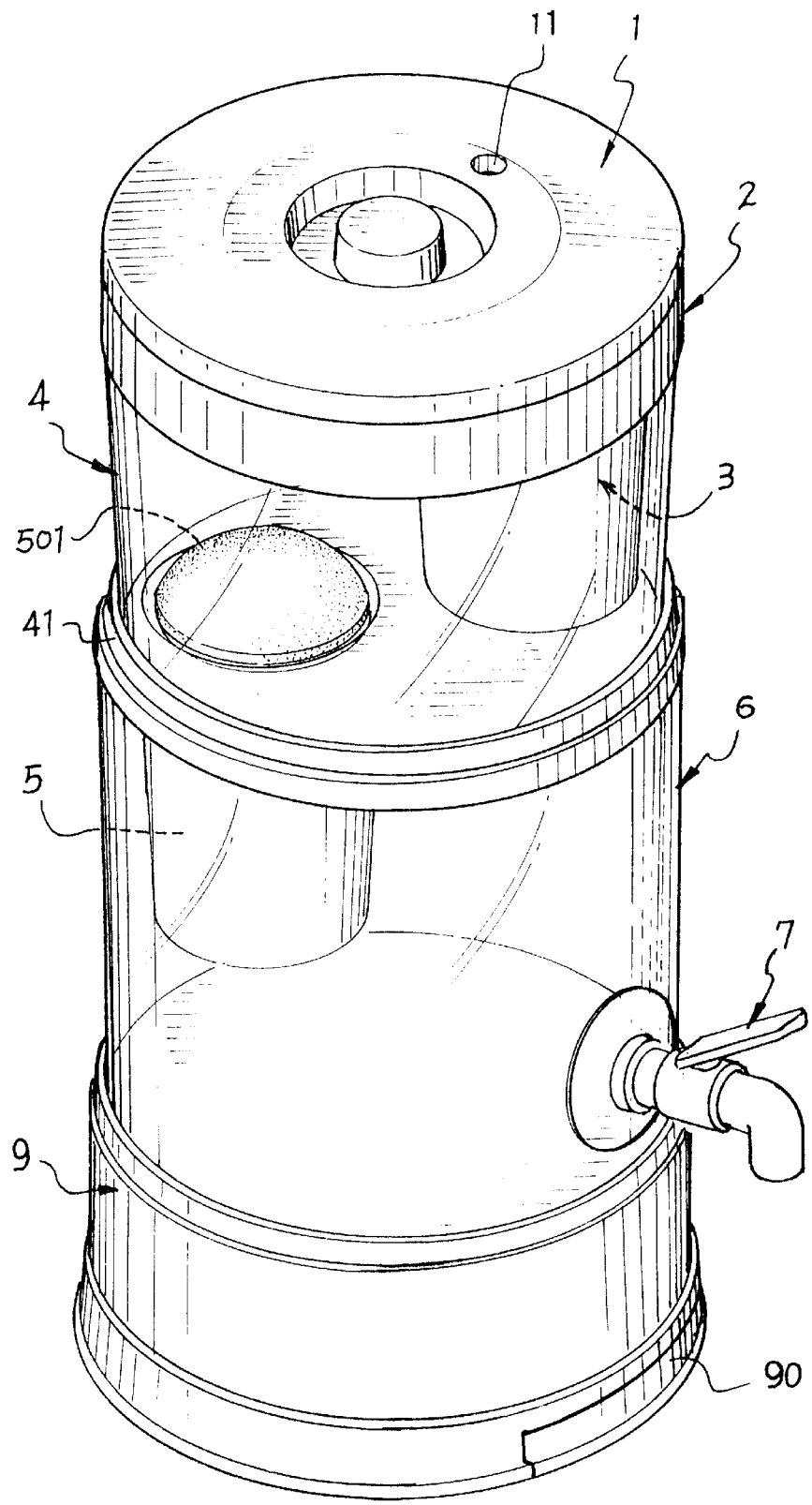
FIG. 1 is a perspective view of the filtering apparatus made according to the present invention.
Figure 2:
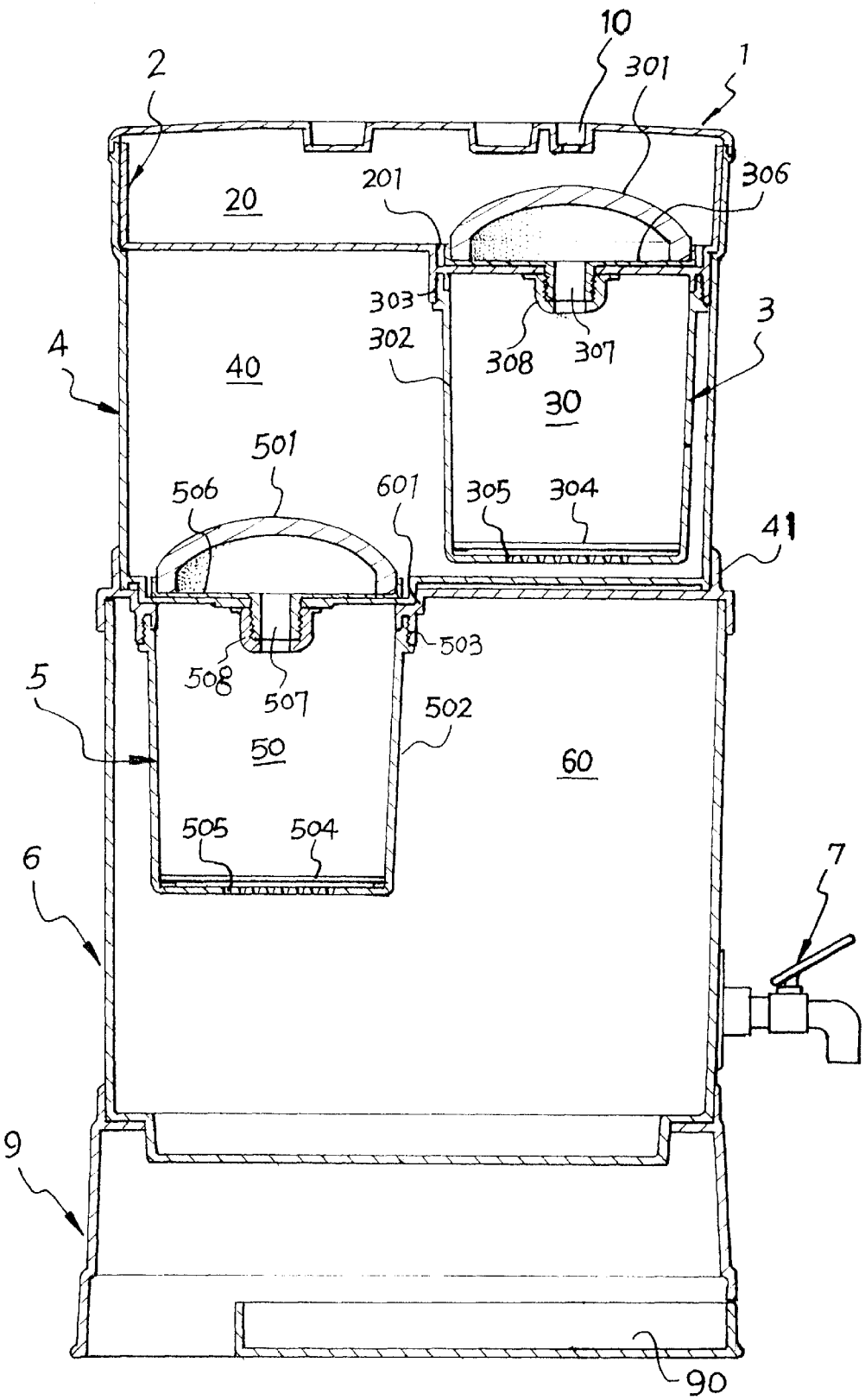
FIG. 2 is a cross sectional view of the filtering apparatus shown in FIG. 1.

Referring to FIGS. 1 and 2, the filtering apparatus made according to the present invention generally comprises a cover 1, an inlet water box 2, a first filtering unit 3, a filtering box 4, a second filtering unit 5, a storing reservoir 6, a mineral substance barrel 8 that is disposed within the reservoir 6, an outlet filtering core 70 that is disposed within the reservoir 6, a spout 7, a bottom bracket 9, and a water pan 90. When the raw water flows from top to bottom, it can be treated with filtrating, deodorizing, ions exchange, sterilizing, magnetizing processes such that the treated water is clean and suitable for direct drinking. The treated water contains plentiful mineral substances that are nutritious to human beings.

The cover 1 and the inlet water box 2 jointly define a first reservoir 20 for containing raw water to be treated. The cover 1 is provided with connector 11 for connecting a hose for supplying water therein. The inlet water box 2 is further provided with a recess 201 in which a first filtering unit 3 is mounted thereof. The first filtering unit 3 includes a filtering core 301 that is disposed above the recess 201; and a filtering barrel 302 that is disposed below the recess 201. The filtering barrel 302 is provided with threaded portion 303 that can be attached to the lower portion of the recess 201. The filtering barrel 302 and the filtering core 301 is separated by a first disk 306. The first disk 306 is provided with water channel 307 in which a connecting ring 308 is attached thereof. The filtering barrel 302 has a cup-shape configuration and defines a filtering room (30) therein. The bottom of the barrel 302 is provided with a supporting screen 304 in which a plurality of openings 305 is provided. The first reservoir 20 is further connected with a filtering box 4 that has same outer diameter with the first reservoir 20 but has larger capacity. The filtering barrel 302 of the first filtering unit 3 is disposed within the filtering box 4. The net volume of the filtering box 4 when the filtering barrel 302 is subtracted is the storing capacity of the second reservoir 40.

By this arrangement, the raw water can be firstly strained through the filtering core 301 of the first filtering unit 3 and the filtering substance filled within the filtering barrel 302. The treated water is then stored within the filtering box 4. The treated water is then passed to the second filtering unit 5, and the storing reservoir 6.

The filtering box 4 is stacked onto the storing reservoir 6 by means of a connecting ring 41. The storing reservoir 6 is also provided with a recess 601 in which a second filtering unit 5 is mounted thereof. The second filtering unit 5 includes a ceramic filtering core 501 disposed above the recess 601; and a filtering barrel 502 that is disposed below the recess 601. The filtering barrel 501 is attached to the lower portion of the recess 601 by means of threaded portion 503. The filtering barrel 502 and the ceramic filtering core 501 is separated by means of a second disk 506. The second disk 506 is also provided with water channel 507 in which a connecting ring 508 is screwed thereof. The filtering barrel 502 has a cup-shape configuration and defines a filtering room 50 therein. The bottom of the filtering room 50 is provided with a supporting screen 504 that as a plurality of opening 505 thereof.

As described above, the raw water that has been firstly treated is stored within the second reservoir 40. The treated water then flows downward by the natural gravity and then passes through the ceramic filtering core 501 of the second filtering unit 5, and then to the filtering barrel 502. When the water flow through the filtering barrel 502, it will be also treated by the filtering substance within the filtering barrel 502. After that, the treated water then flows to the third reservoir 60 of the storing reservoir 6. Till now, the second stage of filtering process is completed and the treated water is stored within the storing reservoir 6. As a matter of fact, the quality of the treated water that passes through the first and second filtering units is qualified for directly drinking. Accordingly, it can be directed from the spout 7 disposed at side of the storing reservoir 6.

Figure 3:
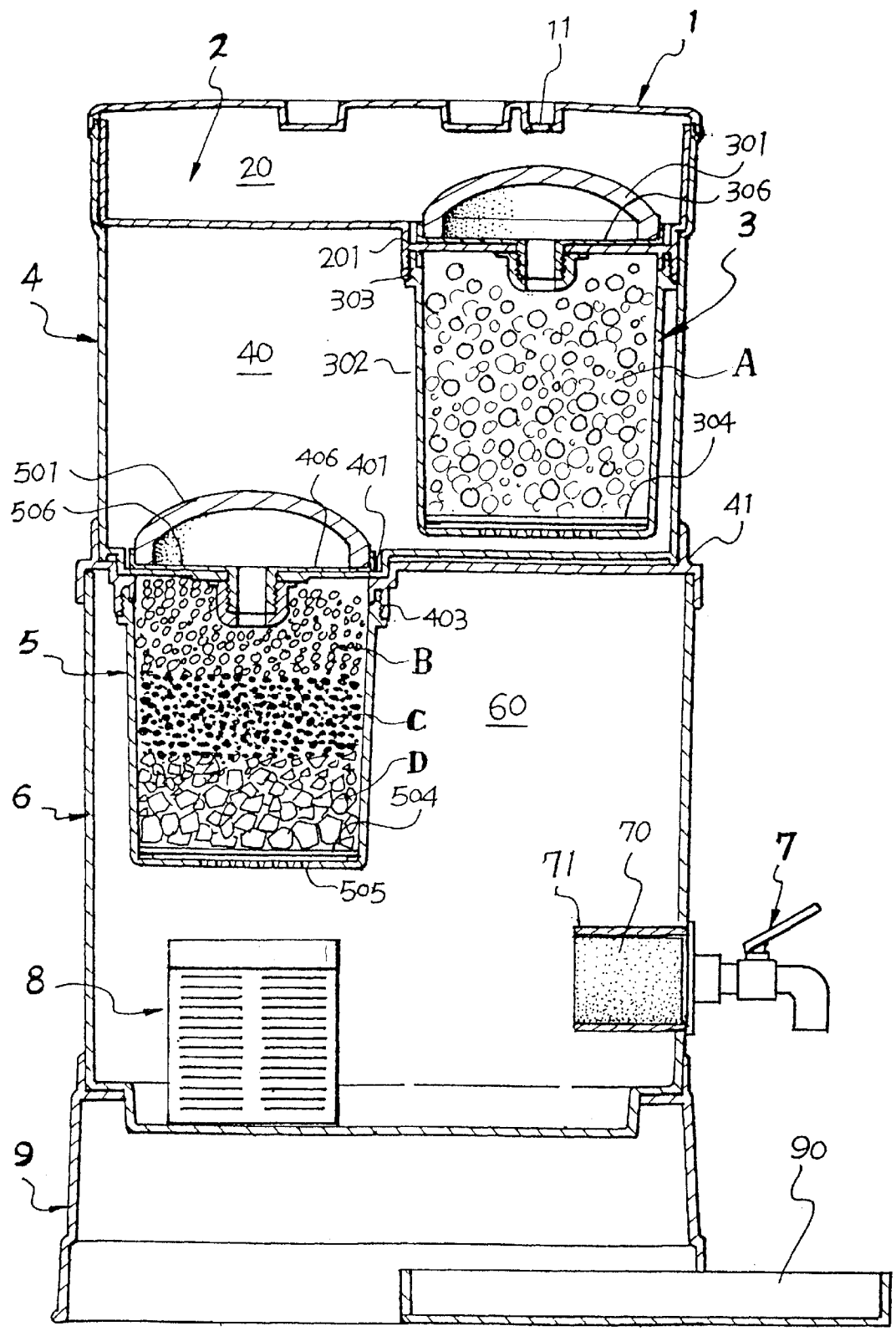
FIG. 3 is a schematic illustration in which the filtering core is filled with stuffing material.
Figure 4:
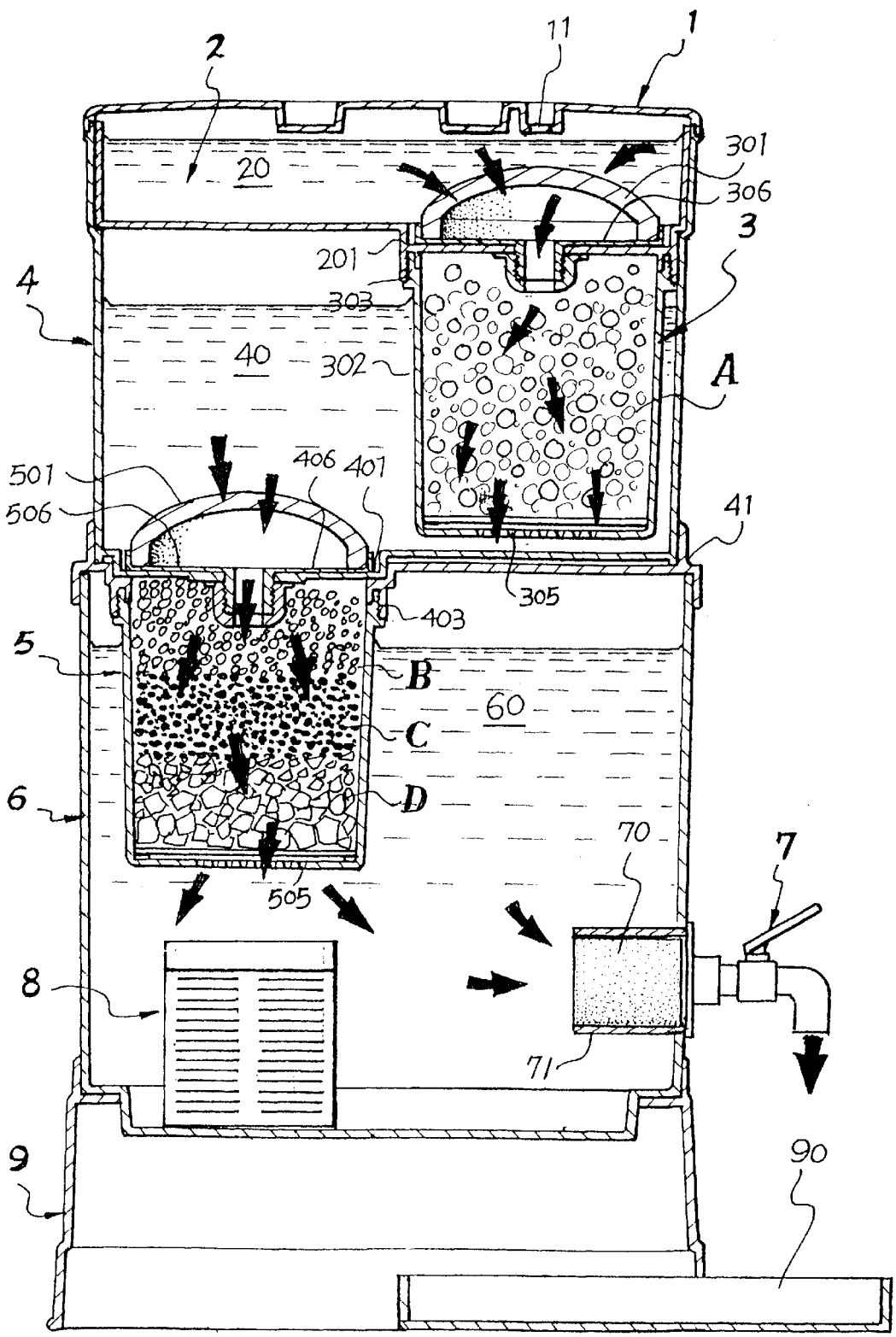
FIG. 4 is a schematic illustration in which the raw water is strained by the filter.

As shown in FIG. 3, the storing reservoir 6 is provided with a bottom bracket 9 in which a drawer-type collecting pan 90 is disposed. By this provision, the excess overflow can be contained therein.

Within the storing reservoir 6, a mineral substance barrel 8 is disposed therein. The mineral substance barrel 8 is filled with mineral stones that may release water-soluble mineral substance. The mineral substance barrel 8 has also a cup-shape configuration and is provided with a plurality of water channels such that the water may readily flow through the mineral stones.

As described, the storing reservoir 6 is provided with a spout 7 at side portion. The spout 7 has an extension 71 in which an outlet filtering core 70 is disposed thereof. The outlet filtering core 70 is made from bio-ceramic material that has magnetic field and radioactivity of micro dose. The inlet and outlet of the ceramic filtering core 70 is provided with a plurality of honey-cone shape orifices. When water flows through those orifices, the water molecular will be changed and modified.

As described above, the outlet filtering core 70 is provided with a plurality of honey-cone orifices axially. These honey-cone orifices can be referred to as a honey-cone ceramic horn (infrared). The water molecular can be magnetized. The ceramic material contains $Al_2O_3$, $ZrO$, $SiO$, $HfO_2$, $FeO$, $Ge$ and $Se$ elements. By this arrangement, the ceramic filtering core itself has a relative strong radioactive wave, ranges from 4~14 $\mu$m. It also has a stronger electromagnetic wave that ranges from 0.05~2 eV. It has a frequency of 60 MHz that means there is 640 hundreds of vibrations per second. As a result, when the water molecular is passed through the ceramic horn, the vibration thereof will activate the water molecular that will be rotated as a top. The mare faster the rotation of the water molecular, the more compact of the water molecular as the water molecular is repeated separated. This separated water molecular is more compatible with the water molecular that has been absorbed by the human tissues. This magnetized water can be readily absorbed by our human tissues.

Figure 5:
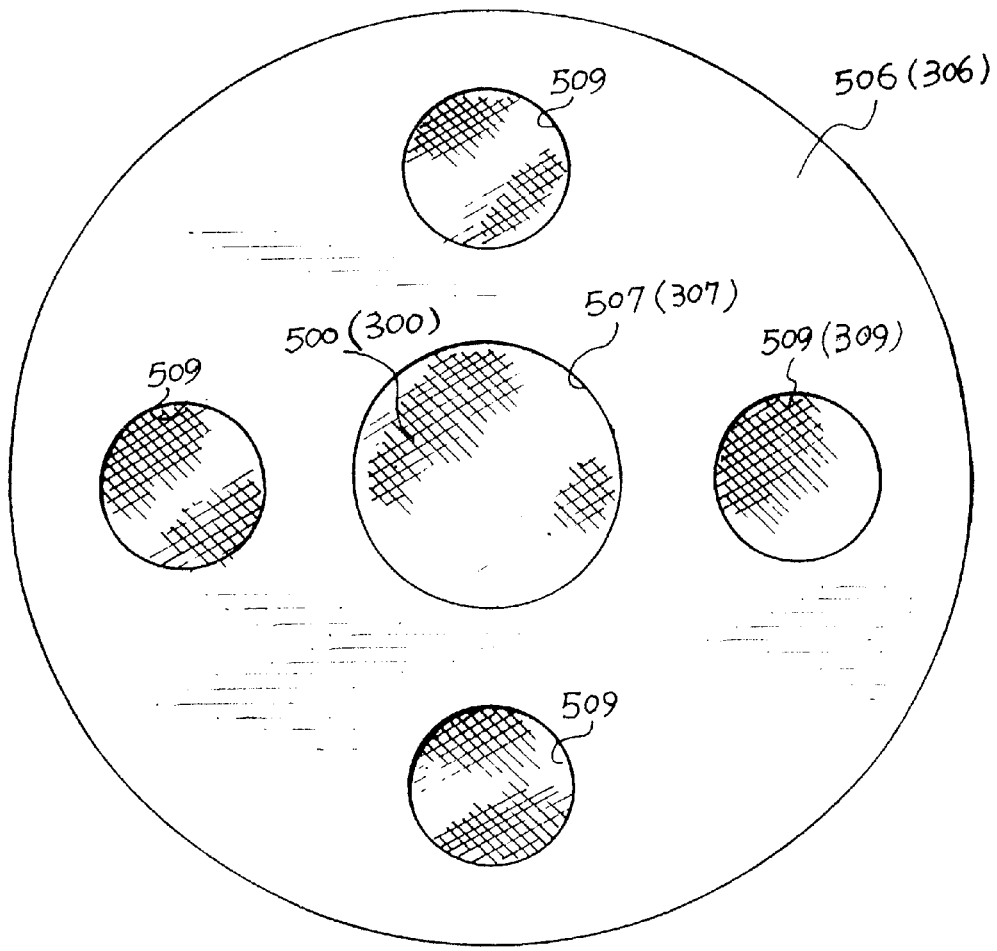
FIG. 5 is a detailed, top plan view of the filtering pan.
Figure 6:
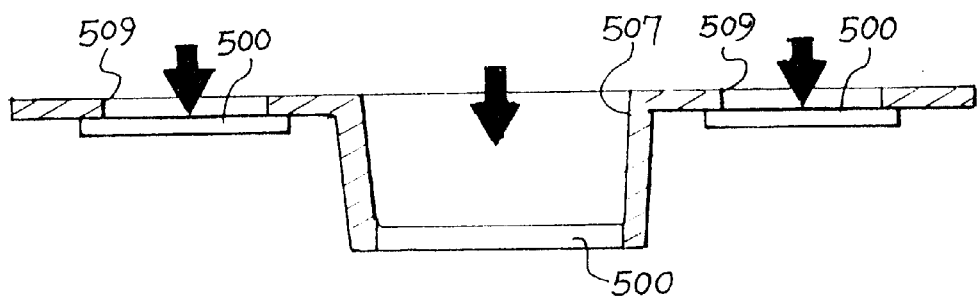
FIG. 6 is a cross sectional view of the filtering pan.

Referring to FIGS. 5 and 6, the detailed description of the filtering apparatus is described. The disks 306, 506 of the first and second filtering units 3, 5 have been provided with downward draining channel. The disks 306, 506 can be also provided with a plurality of draining channels 309, 509 around the peripheral except the water channels 307, 507 disposed at central portion. However, each of the water channels is provided with filtering screen 300, 500. Accordingly, the disks may also provide filtering effect.

The filtering processes of the present invention through those above described components will be detailedly described as follow.

1. The raw water is firstly supplied to the first reservoir 20 of the inlet water box 2. The raw water is then strained by the dome-shape filtering core 301 of the first filtering unit 3. The mesh size is about 0.5 micrometer and the particles, sediments, suspending, and sand or soil within the water can be completed strained out.

2. The firstly treated water then flows to the filtering barrel 30 of the first filtering unit 3. The filtering barrel 30 is disposed with ions exchange substance A and when the water flows through the ion exchange substance A, the water can be completely softened from hard water to soft water. The soft water then flows to the second reservoir 40 of the filtering box 4.

3. The soft water stored within the second reservoir 40 then flows downward to the ceramic core 501 of the second filtering unit 5 and into the filtering room 50. The ceramic core 501 is made from ground stone powders and has a dome-shape configuration. The interstice therein is about 0.2 micrometer, that is about one over two hundreds of the outer diameter of our hair. When softened water flows through with low speed, the bacteria, such as the cholera bacteria etc.

will be completely filtered. Moreover, the heavy metal, such as the mercury, copper, aluminum, and cadmium element will be also screened out.

4. Then the treated water flows to the filtering barrel 502 of the second filtering unit 5. The filtering barrel 502 is disposed with a first layer of activated charcoal B, a second layer of silver activated charcoal C, and a third layer of mineral sands D. The chloride, chemical, and herbicide can be screened out by the first activated charcoal layer B. The second silver activated charcoal layer C is used for sterilizing. The third mineral sands layer D is used to modify the pH value of the water. Accordingly, pure and clean water can be attained. On the other hand, the third layer of mineral sands D can be also disposed with activated charcoal to deodorize. After that the treated water flows to the third reservoir 60.

5. As a mater of fact, the quality of treated water may reach to a level that can be drunk directly, i.e. the user may directly use the treated water from the spout 7 disposed at side portion of the storing reservoir 6. However, the third reservoir 60 can be also disposed with a mineral stone barrel 8 in which the water soluble mineral substance can be released. Accordingly, the treated water is provided with a little bit of sweet taste.

6. The storing reservoir 6 is provided with a spout 7 at side portions. The spout 7 has an extension 71 in which an outlet filtering core 70 is disposed thereof. The outlet filtering core 70 is made from bio-ceramic material that has magnetic field and radioactivity of micro dose. The inlet and outlet of the ceramic filtering core 70 is provided with a plurality of honey-cone shape orifices. When water flows through those orifices, the water molecular will be changed and modified.

From the above description, it can be readily appreciated that the raw water can be readily treated through a plurality of filtering processes in which the debris can be screened, the water can be softened, the water is purified, the bacteria is sterilized, the heavy metals are removed, the chemical toxicity is removed, the pH value is modified, the nourish mineral substance is added, the water molecular is magnetized and modified. The treated water is suitable for direct drinking.

A water quality analysis report made by SGS Taiwan Limited is also submitted for reference.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A mineral filtering apparatus in which raw water is passed through an automatic filtration means, said filtering apparatus comprising:

a cover, an inlet water box, a first filtering unit, a filtering box, a second filtering unit, a storing reservoir, a mineral substance barrel that is disposed within said storing reservoir, an outlet filtering core that is disposed within said storing reservoir, a spout, a bottom bracket, and a water pan, wherein;

when the raw water flows from top to bottom of said mineral filtering apparatus, the water is treated with a plurality of processes such that the treated water is clean and suitable for direct drinking, the treated water contains mineral substances that are nutritious to human beings; and wherein said cover and said inlet water box jointly define a first reservoir for containing raw water to be treated, said cover being provided with a connector for connecting a hose for supplying water to said first reservoir, said inlet water box being further provided with a recess in which said first filtering unit is mounted, said first filtering unit including a filtering core that is disposed above said recess and a filtering barrel that is disposed below said recess, said filtering barrel being provided with a threaded portion that is attached to a lower portion of said recess, said filtering barrel and said filtering core being separated by a first disk that is provided with a water channel in which a connecting ring is attached, said filtering barrel having a cup-shape configuration and having a plurality of openings at a bottom, wherein the treated water is stored within said first reservoir and then flows toward said second filtering unit for further treating and filtrating;

said filtering box being stacked onto said storing reservoir by means of a connecting ring disposed at the bottom of said filtering box, said storing reservoir being also provided with a recess in which said second filtering unit is mounted, said second filtering unit including a ceramic filtering core disposed above said recess, and a filtering barrel that is disposed below said recess, said filtering barrel and said ceramic filtering core being separated by means of a second disk that is also provided centrally with a water channel in which a connecting ring is secured said filtering barrel having a cup-shape configuration and having a plurality of openings therein.

2. The mineral filtering apparatus as recited in claim 1, wherein said storing reservoir is disposed on a bottom bracket on which a drawer-type collecting pan is disposed to collect excess water.

3. The mineral filtering apparatus as recited in claim 1, wherein said storing reservoir is further provided with a mineral stone barrel in which a plurality of mineral stones that contain water soluble minerals are disposed, said mineral stones having a cup-shape configuration and being provided with a plurality of water channels such that the treated water may readily flow through said mineral stones.

4. The mineral filtering apparatus as recited in claim 1, wherein said storing reservoir is provided with a spout at a side portion, said spout having an extension in which an outlet filtering core is disposed, said outlet filtering core being made from a bio-ceramic material, the inlet and outlet of said outlet filtering core being provided with a plurality of orifices.

5. The mineral filtering apparatus as recited in claim 1, wherein said filtering barrel of said first filtering unit is filled with ion exchange material, and said filtering barrel of said second filtering unit is disposed with a layer of activated charcoal, a second layer of silver charcoal, and a third layer of mineral sands.

* * * * *